Patented Mar. 13, 1934

1,950,739

UNITED STATES PATENT OFFICE 1,950,739

REFINING TREATMENT OF HYDROCARBON OILS

Jacque C. Morrell, Chicago, Ill., assignor to Universal Oil Products Company, Chicago, Ill., a corporation of South Dakota No Drawing. Application November 15, 1929, Serial No. 407,370

1 Claim. (Cl. 196—40)

This invention relates to the treatment of hydrocarbon oils such as petroleum distillates, and more particularly to the treatment of cracked petroleum distillates. The principal agent for the treatment of petroleum distillates is sulphuric acid. This substance possesses the property of removing undesirable highly unsaturated compounds such as the diolefins and also has the property of removing either by solution or reaction undesirable sulphur compounds. The presence of too high a percentage of the sulphur compounds is undesirable because upon combustion of the motor fuel in an automotive engine sulphuric acid is formed which under certain conditions will cause corrosion of the motor parts.

In the treatment of cracked distillates with sulphuric acid, considerable loss of the distillate will occur, owing to the reactive nature of the olefins and some of the aromatic compounds present in the distillate. For cracked distillates of low sulphur content, the amount of acid used in the treatment may be regulated to reduce this loss, but where the cracked distillate contains a high percentage of sulphur compounds, a large amount of sulphuric acid is necessary to remove these compounds. The sulphuric acid reacts simultaneously with unsaturated compounds present in the distillate, removing a large percentage by direct reaction and solution and simultaneously converting some of the low boiling hydrocarbons into higher boiling hydrocarbons which in effect causes conversion of gasoline into gas oil. It is the principal object of the present invention to avoid such losses and in carrying out the process of the invention, certain materials which will be referred to as spacing agents are used. These agents have the property of cutting down the reaction with the olefins while permitting the sulphuric acid to function as a refining and desulphurizing agent. Specifically, the kind of spacing agents used in the present invention are a class of salts known as sulphates. Among those sulphates which have given good results are the sulphates of the alkalis such as sodium and potassium either alone or in admixture with each other, the sulphates of the alkaline earth metals such as magnesium, barium, calcium and strontium, lead sulphate, silver sulphate and other sulphates of the heavy metals. As examples of the solubility of these sulphates in sulphuric acid, the following are cited:

In the case of fuming sulphuric acid, barium sulphate is 14 to 16% soluble, calcium sulphate 10%, strontium sulphate 8 to 10%, lead sulphate 4%, silver sulphate 20 to 30%, ammonium sulphate 21%, lithium sulphate 16%, mercury sulphate 4%. Other sulphates of small solubility but showing some desirable effects are ferrous sulphate, zinc sulphate, magnesium sulphate and copper sulphate.

It is also contemplated in this invention to utilize the acid sulphates and the pyrosulphates. Mixtures of various sulphates of the classes named above may also be used. In carrying out the invention, the sulphate is dissolved in the proper proportion in the sulphuric acid and the resultant mixture is used in the same manner as ordinary sulphuric acid, which contains no dissolved salt. For example, in one method of treatment, a distillate is treated with 30 lbs. per barrel of a mixture containing 8 to 10% by weight of sodium sulphate. After agitating and properly contacting with this mixture, the sludge is withdrawn and removed, and the distillate is water washed. It is then neutralized with caustic soda solution either alone or containing litharge dissolved therein. The solution from this treatment is withdrawn and the distillates subjected to a distillation preferably in the presence of steam.

As examples of results obtained with various sulphates and for comparison with a test made with acid containing no sulphate, the following is cited:

A cracked distillate of 54° Bé. gravity containing .7% sulphur was treated with 30 lbs. of 30% oleum per barrel of distillate. The sulphur content of the resulting gasoline was 0.14%. A total loss of 13.3% was obtained of which 10% was solution loss and 3.3% was polymerization loss. Using sodium sulphate as a spacing agent, the loss was reduced to 10%, showing 7% solution loss and 3% polymerization loss. Similar results were obtained with potassium sulphate and ammonium sulphate. The sulphur content was approximately the same as the standard but the amount of acid used for the same desulphurization was less. In this connection it is pointed out that a cheap salt such as sodium sulphate was substituted for sulphuric acid with approximately the same desulphurizing results and a marked improvement in cutting down losses. Barium and calcium sulphates also gave similar results. Mixtures of sulphates gave improved results both in cutting down losses and sulphur content. The gasoline product resulting from this treatment was water white and sweet in odor and of good stability. In recovering the sulphuric acid, the dissolved salts may be likewise recovered. Good results have also been obtained by mixing certain organic spacing agents such as glycerine, alcohol, acetic acid, etc. with treating mixture of sulphuric acid and the sulphate.

I claim:

The method of refining hydrocarbon distillates containing unsaturated hydrocarbons and sulphur compounds which comprises subjecting the same to the action of sulphuric acid containing at least 8% by weight of a dissolved sulphate of an alkaline earth metal.

JACQUE C. MORRELL.